(12) United States Patent  
Cousins (10) Patent No.: US 9,185,043 B2  
(45) Date of Patent: Nov. 10, 2015

(54) TELECOMMUNICATIONS PROTOCOL WITH PID CONTROL OF DATA TRANSMISSION RATE

(75) Inventor: Robert Cousins, Saratoga, CA (US)

(73) Assignee: Saratoga Data Systems, Inc., Saratoga Springs, NY (US)

( * ) Notice: Subject to any disclaimer, the term of this patent is extended or adjusted under 35 U.S.C. 154(b) by 224 days.

(21) Appl. No.: 13/082,869

(22) Filed: Apr. 8, 2011

(65) Prior Publication Data

US 2012/0259989 A1  Oct. 11, 2012

(51) Int. Cl.
*H04L 12/825* (2013.01)
*H04L 12/823* (2013.01)

(52) U.S. Cl.
CPC ............ *H04L 47/263* (2013.01); *H04L 47/266* (2013.01); *H04L 47/32* (2013.01)

(58) Field of Classification Search
CPC ....... H04L 47/263; H04L 47/10; H04L 47/27; H04L 47/283; H04L 47/35; G06F 11/1402
USPC ................... 370/229, 232, 233, 234; 714/781
See application file for complete search history.

(56) References Cited

U.S. PATENT DOCUMENTS

| | | | | |
|---|---|---|---|---|
| 6,587,434 | B1 * | 7/2003 | Cousins ........................ | 370/230 |
| 7,643,418 | B1 * | 1/2010 | Varier et al. ................. | 370/232 |
| 7,957,598 | B2 * | 6/2011 | Bates et al. .................. | 382/232 |
| 8,078,944 | B2 * | 12/2011 | Cousins ........................ | 714/781 |
| 8,310,920 | B2 * | 11/2012 | Goldfein et al. .............. | 370/229 |
| 8,312,356 | B1 * | 11/2012 | Cousins ........................ | 714/781 |
| 8,566,286 | B1 * | 10/2013 | Hawton et al. ................ | 707/654 |
| 2006/0104313 | A1 * | 5/2006 | Haner et al. .................. | 370/517 |
| 2006/0159098 | A1 * | 7/2006 | Munson et al. ................ | 370/394 |
| 2008/0267184 | A1 * | 10/2008 | Arisoylu et al. .............. | 370/391 |

OTHER PUBLICATIONS

Ryu et al., A Predictive and Robust Active Queue Management for Internet Congestion Control, Jul. 3, 2003, IEEE, vol. 2, pp. 991-998.*

(Continued)

*Primary Examiner* — Vivek Srivastava
*Assistant Examiner* — Muhammad A Raza
(74) *Attorney, Agent, or Firm* — Thomas Schneck; Mark Protsik (57) ABSTRACT

A computer data transmission system is provided with proportional-integral-derivative (PID) control over a data transmission rate so as to maximize use of available bandwidth of a datagram-based network. A data channel and a separate feedback channel are established between the sender and receiver units of the system. The sender unit coupled to the data and feedback channels sends datagrams over the data channel to the receiver continuously until a source of data is exhausted or paused by the receiver unit. The receiver unit sends acknowledgment messages over the feedback channel to the sender unit at predetermined intervals. A PID controller in the sender unit uses the information provided in the acknowledgment messages to track unsuccessfully transmitted datagrams and to adapt the data transmission rate to any changing network transfer conditions. In particular, the rate of datagram loss may be used as a PID process variable to control an inter-datagram delay of the sender. There may also be absolute speed and transmission rate acceleration/deceleration limits constraining the PID control. PID control may also be adapted for data compression control, datagram block sizes, and degree of redundancy in the datagrams sent.

30 Claims, 4 Drawing Sheets

(56) References Cited

OTHER PUBLICATIONS

J. Aweya et al., "Rated-based Proportional-integral Control Scheme for Active Queue Management", Int'l Journal of Network Management, Mar. 2006, vol. 16, pp. 203-231.

Y. Hong et al., "Design of Adaptive PI Rate Controller for Best-Effort Traffic in the Internet Based on Phase Margin", IEEE Trans. on Parallel & Distributed Systems, vol. 18, No. 4, Apr. 2007, pp. 550-561.

Li Yu et al., :An Analysis and Implementation Study on a Robust Congestion Controller for the Internet, Int'l Conference on Advanced Infocomm Tehcnology, Jul. 29-31, 2008, Shenzhen, China, 6 pages.

Y. Gu et al., "Experiences in Design and Implementation of a High Performance Transport Protocol", IEEE, SC '04, Nov. 6-12, 2004, Pittsburgh, Pennsylvania, 14 pages.

Y. Gu et al., paper on "UDT: UDP-Based Data Transfer Protocol—Draft", Internet Engineering Task Force, Univ. of Illinois at Chicago, Oct. 2007, 20 pages.

\* cited by examiner

TELECOMMUNICATIONS PROTOCOL WITH PID CONTROL OF DATA TRANSMISSION RATE

TECHNICAL FIELD

The present invention relates to computer data transmission systems and methods for data transfer over networks, such as the internet using TCP/IP, and in particular control of data transmission rates in such systems based on changing data transfer conditions in such networks.

BACKGROUND ART

In recent years, some limited attempts have been made to apply software PID control to control computer data network traffic. Consistent with the historical application of hardware PID controllers, these applications have focused on stabilizing traffic to avoid highly fluctuating data transmission rates.

Aweya, et al., in "Rate-based proportional-integral control scheme for active queue management", *International Journal of Network Management*, March 2006, present a two-term Proportional-Integral (PI) control algorithm that enables rate-based Active Queue Management (AQM) schemes to "match the aggregate rate of the active TCP connections to the available capacity while maintaining minimal queue size and high link utilization".

Hong, et al., in "Design of Adaptive PI Rate Controller for Best-Effort Traffic in the Internet Based on Phase Margin", IEEE Press, April 2007, proposed a PI rate controller to provide best-effort traffic in the Internet. This AQM control system aims to improve transient behavior by adapting to sudden changes in the network environment.

Li Yu, et al., in "An Analysis and Implementation Study on a Robust Congestion Controller for the Internet", International Conference on Advanced Infocomm Technology, Jul. 29-31, 2008, Shenzhen, China, describe a PID controller for Internet congestion control, the main advance being its robustness in adapting to dynamic networks.

In contrast, an important goal of the present invention is to maximize the data transmission rate within available bandwidth limits, i.e. to transmit datagrams as rapidly as possible while avoiding unacceptable amounts of datagram losses or corruption under changing network conditions.

SUMMARY DISCLOSURE

The present invention is a computer data transmission system, and a corresponding method, configured to transfer data between a sender unit and a receiver unit over a datagram-based network, wherein the data transfer is characterized by use of a feedback system over the transmission rate so as to maximize use of available bandwidth in an established data channel of the network. One implementation of the feedback system uses proportional-integral-derivative (PID) control over the data transmission rate. For example, the PID control can adjust an inter-datagram delay based on a rate of datagram loss, as determined from acknowledgement messages received over an established feedback channel. That adjusted delay establishes the duration between the sending of consecutive datagrams. The PID control thereby maximizes the data transmission rate according to fluctuating network data transfer conditions.

In one particular embodiment, the system and method containing this PID control may be implemented into data transfer technology referred to herein as "Flume". Flume is a patent pending technology (see applicant's US Patent Application Publication 2008/0225842A1, which is incorporated herein by reference) that was developed to improve the efficiency (speed and throughput) of long distance data transmission over the internet using TCP/IP and UDP. The present invention enhances that technology by applying modified Proportional-Integral-Derivative control (PID) to Flume's transmission rate control processes, so as to optimize the transmission rate (accelerating and decelerating as necessary to maintain maximum speed within limits), rather than stabilize the speed at some preset value as would be achieved with traditional PID. Flume is able to transmit data over a "low quality" internet connection as quickly as possible. "Low quality" network conditions include intermittent connection wherein the network experiences regularly recurring loss of communication, high network latencies, substantial datagram loss or corruption, constantly varying amounts of available bandwidth, and real-time changes in routing from one datagram to the next. Internally, Flume views a high latency connection as a storage device. For example, a 1 megabyte per second channel with 500 ms latency can store approximately 500 KB of datagrams. But the changing network causes the size of this storage device to change from moment to moment.

Ideally, Flume would transmit datagrams at exactly the rate of the available bandwidth such that no datagrams are dropped due to congestion, yet sending any additional datagrams would result in drops. This is the ideal which Flume measures itself against. The role of the PID component of the present invention is to measure the difference between the instantaneously available bandwidth and the bandwidth Flume tries to use and then to tailor Flume's demands to stay just within the bandwidth envelope. If the available bandwidth envelope shrinks (perhaps due to another application's use of the channel), the drop rate increases causing the error term to increase and causing Flume to slow its transmission rate. Then, over time, Flume will attempt to accelerate its transmission (due to the integral term) until the error rate begins to climb again.

In yet another embodiment, a system and method containing PID control in accord with the invention may be further enhanced by implementing it for yet another data transfer technology referred to herein as "Pluribus". Pluribus is a technology (see US Patent Application Publication 2009/0204859A1, which is incorporated herein by reference) that allows creation of controlled amounts of redundancy and the use of the redundancy to recover the initial data. The PID technology could be used to control the number of redundant datagrams transmitted initially based on the number of datagrams that are predicted to be lost out of each set of initial datagrams. PID control minimizes the overuse of redundancy.

DETAILED DESCRIPTION

Feedback based control systems are the basic mechanism for most control systems. Usually, feedback systems are based upon a mathematical relationship between error and a process variable (or sets thereof in the multidimensional case). For purposes of this disclosure, a proportional-integral-derivative (PID) control system is used, but it should be apparent to those having skill in the associated arts that other suitable mathematical or algorithmic based control processes could be used to achieve the same basic ends. The key is the use of feedback and storage of state to control ongoing operations.

Proportional-integral-derivative (PID) control is most commonly used in industrial applications to stabilize the behavior of machines. Basically, PID controllers monitor the error between a process variable (e.g., speed) of a machine and a desired setpoint and then adjust control inputs to minimize the error. The basis of a PID system is feedback—output a value, measure error and then adapt. An input is repeatedly measured, an error value is determined and an output is changed based on that error value. PID seeks to produce an optimal value for the monitored variable MV, which is a function of three types of calculations:

Proportional (gain): where the output is proportional to the error value

Integral (reset): where the output is proportional to the integral (magnitude and duration) of the error value Differential (rate): where the output is proportional to the derivative (change over time) of the error value All three are based upon the error from the intended value. The basic PID equation is:

$$MV(t) = K_p e(t) + K_i \int_0^t e(\tau)d\tau + K_d \frac{d}{dt}e(t)$$

where $K_p e(t)$ is the proportional term, $K_i \int_0^t e(\tau)d\tau$ is the integral term and $$K_d \frac{d}{dt}e(t)$$

is the differential term. Tuning the system involves optimizing the K values $K_p$, $K_i$ and $K_d$. The K values are tuning factors for each of the three components to weigh the impact of each component on the ultimate manipulated value.

In a digital environment, such as in data networks, the integral term is represented by a cumulative sum of error values over a predefined set of measurement samples, while the derivative term is represented by a difference in error values between consecutive samples. Also, in a digital environment, there is normally some delay from a change in input value to a consequent change in output. This delay is inherent in the sequential nature of processing.

The discussion so far has been single dimensional with one monitored value, one error value and one feedback value. Also, it has used purely linear functions for the error value e(t). A multidimensional implementation of PID looks more like this:

$$MV(t) = K_p e(t) \Big| K_i \oiint_0^t e(\tau)d\tau \Big| K_d \nabla e(t)$$

Where t is a vector field and e(t) is a function over the vector field (not necessarily linear).

The concept of PID control, generally, has great potential in controlling the rate of transmission of data. There are significant differences, however, in typical PID methodology and what the present invention accomplishes. To illustrate by analogy, consider these two scenarios:

Scenario 1: A family car driver trying to cruise at a CONSTANT and PREDETERMINED speed.

In scenario 1, the goal is system EQUILIBRIUM to achieve CONSTANT SPEED. Success is measured strictly in terms of one value: the SPEED of the car as compared to a PREDETERMINED value.

Scenario 2: A race car driver trying to MAXIMIZE speed while keeping DANGER UNDER CONTROL and reacting to rapidly changing driving conditions/traffic and subject to SPEED LIMITATIONS (flags).

In scenario 2, the goal is ADAPTATION to achieve MAXIMUM SPEED given conditions at all times. Success is more difficult to measure and maintain. Yes, you want to go as fast as you can at all times but there are multiple considerations: SPEED, per se, but not compared to a preset value, rather "as fast as you can"; DRIVING CONTROL; and SPEED LIMITS.

Standard PID control is analogous to scenario 1 functionality and goals. In contrast, the present invention is akin to a scenario 2 application intended to transmit data as fast as it can up to the inherent limits of the current transmission medium and within "good citizen" limits. Transmission speed can be constricted when connection conditions (high congestion, poor condition . . . ) result in bad/lost transmissions demanding time-consuming retransmission.

A major goal of the network system is that datagrams are transferred as quickly as possible within the limits of the network's available bandwidth. It is simple to transmit too slowly but this result in reduced throughput. Similarly, it is simple to transmit too quickly, but this produces datagram loss and results in reduced throughput. As transmission speed increases, throughput increases until such time that the effective bandwidth of the channel is consumed. Once the transmit rate is faster than the capacity of the channel, then some of the datagrams must be dropped which results in those datagrams not reaching the receiver. The receiver must then decide which datagrams are missing and go through a recovery process. Over time, the available channel bandwidth changes. By its nature, the internet is a shared communications medium made up of segments with finite bandwidth. Not all applications make continuous demand for bandwidth, and applications come and go. The result is that a given network segment may go from totally consumed to partially consumed in a short period of time. Furthermore, some connections are truly intermittent—periodically having zero bandwidth for an unknown period of time. Therefore, optimal throughput is to take advantage of whatever bandwidth is available at any point in time. Throughput must therefore be adaptive, with a "goal" for throughput, but also with an "error function" for controlling datagram loss. The error function cannot be the obvious one—datagram loss —since the goal is more than minimizing loss (very slow transmission will achieve this) but also maximum throughput. The user enters a target goal for throughput (e.g., 1000 KB/sec). The PID controller aims to maximize speed up to this limit by manipulating the Inter-datagram Delay.

Accordingly, the present invention includes a method integrated into a computer data transmission system of transferring data between a sender and a receiver in a datagram-based network, wherein proportional-integral-derivative (PID) control over a data transmission rate is applied by a sender unit to the sending of datagrams over the data channel in a manner that maximizes use of the available bandwidth in the established data channel independent of network latency. The method begins by establishing a data channel between a sender unit and a receiver unit and establishing a feedback channel separate from the data channel between the sender and receiver units. Then, datagrams are sent continuously from the sender unit to the receiver unit over the data channel until a source of data is exhausted or the transmission is paused by the receiver unit. The receiver unit sends acknowledgment messages to the sender unit over the feedback channel at predetermined intervals. The PID controller in the sender unit uses the acknowledgement messages in the sender unit to track unsuccessfully transmitted datagrams and thereby react to any changing network transfer conditions by changing the data transmission rate.

In addition to controlling the data transmission rate, the sender unit may, depending on the particular requirements of the network data communication, resend any datagrams that have been identified as having been unsuccessfully transmitted. Unsuccessful transmission refers to datagrams that are lost, corrupted and otherwise unrecoverable without retransmission. However, in the case of real-time communication, such as voice-over-IP, resending of data may not be desired and the feedback from the acknowledgement messages may be used solely by the PID controller to minimize future losses of data by adjusting the data transmission rate as needed.

The invention likewise includes a computer data transmission system configured to transfer data over a datagram-based network, where the sender unit has the aforementioned proportional-integral-derivative (PID) control over the data transmission rate. The system comprises the network data and feedback channels, a sender unit coupled to the data channel and the feedback channel at a first endpoint of the datagram-based network, and a receiver unit coupled to the data channel and the feedback channel at a second endpoint of the datagram-based network. The sender unit is configured to transmit datagrams over the data channel continuously until a source of data is exhausted or paused. The receiver unit is configured to receive datagrams from the data channel and to transmit acknowledgment messages at predetermined time intervals over the feedback channel back to the sender unit. The sender unit is also configured to receive the acknowledgment messages from the feedback channel and employs its PID controller to track any unsuccessfully transmitted datagrams and react to changing network transfer conditions.

In network data transmission in accord with the present invention, "net throughput" can be thought of as being the final amount of "effective data" that is transferred from the sender to the receiver. For example, if n datagrams are sent but only n−m are received correctly (not lost or corrupted) and therefore m must be retransmitted, then n+m datagrams are actually sent but the net throughput is only n−m in the overall time required to perform the transfer. Conversely, data can be compressed. If the same n datagrams above can be compressed into, say, n/2 datagrams through compression, then the net throughput is n in half the time that would be required with no compression (assuming identical network conditions and no compression time overhead). In short, any method by which the amount of data which must ultimately be transferred can be reduced results in higher throughput. Or, any data which must be sent but does not result in data transferred is either overhead or wasted.

If we were trying to stabilize transmission speed using PID control, speed itself (some measure of it such as datagrams received per unit of time) would be the process variable in the PID equation. However, since we are trying to maximize speed at each point in time, we need the process variable to reflect system performance in some other way. The variable that most significantly reflects the rate of transmission "success" is the most current failure rate at each time we are applying the PID control equation as measured by the number of datagrams lost/corrupted as a percentage of those sent in total. In short, if the value of the PID control equation is rising, we need to slow our transmission speed. If it's falling we can accelerate. In a preferred embodiment of the present invention, the PID control's process variable may be preset to a 2% datagram loss/corruption rate. Such a preset value can be overridden by a user at the time of system initiation, if desired.

Another significant difference between the PID controller in the current invention and traditional PID controllers is the fact that there is a lengthy delay between consecutive SYN datagrams from the receiver to the sender and, therefore, the PID calculations are performed periodically rather than continuously. This periodicity builds in a delay component to the system which is valuable. The algorithms can be optimized to enhance regularity and computational stability through smoother stepsize sequences.

Application of PID control over the data transmission rate adjusts an inter-datagram delay, thereby establishing a time interval between the sending of consecutive datagrams. In particular, the system's datagram transmission rate is determined by the duration of each Inter-Datagram Delay (IDD): the amount of time that sender unit waits between sending two consecutive datagrams. A user can enter a desired overall throughput rate (e.g., 1000 KB/sec). An initial IDD is computed using this desired throughput and the size of data in each datagram, where if a datagram is sent every IDD interval, the desired throughput will be achieved. The rate is typically discounted by 80% for a starting point. This IDD is never allowed to increase resulting in a transmission rate of less than 60 KB per second or 8 datagrams per "SYN" (synchronization) datagram from the receiver to the sender. The system's PID control algorithm periodically modifies the IDD to adapt to changing network conditions.

The primary modification to the fundamental PID control function relates to the control variable: the variable measured to determine if, in this case, transmission should be accelerated, decelerated or maintained. This variable is compared to a desired setpoint. In controlling speed, standard PID control would use speed, per se, as its control variable. The current invention, however, uses the rate of bad transmission as the control variable (as measured by the number of datagrams not received correctly as a percentage of the number of datagrams actually sent). The desired setpoint can be a 2% error rate (which can be changed by the system user at system initiation time).

Figure 1:
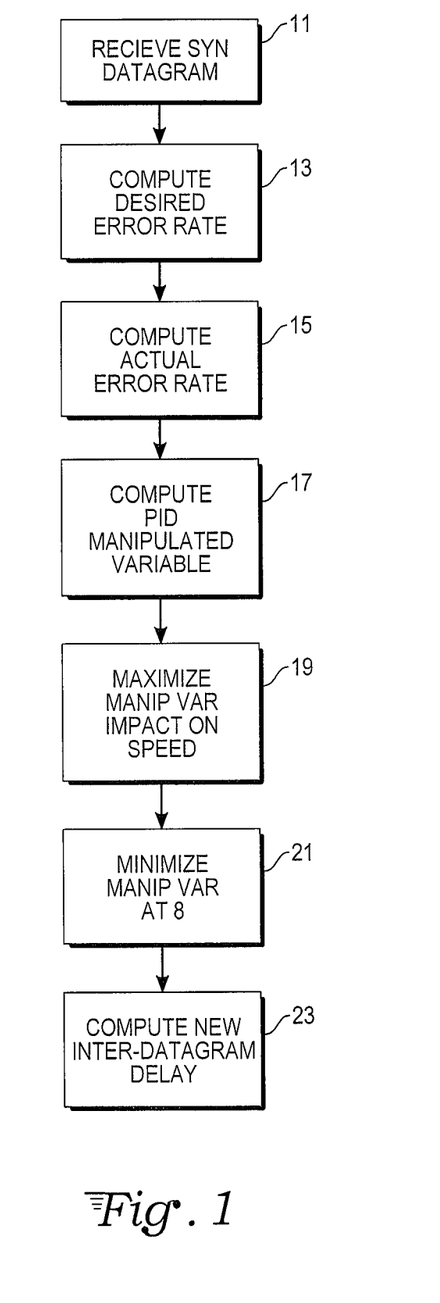
FIG. 1 is a flow diagram of a sender unit's PID control algorithm for implementing PID control over data transmission rate in a network.

With reference to FIG. 1, the process variable monitored by the PID control is a rate of datagram loss, calculated as a ratio of number of datagrams lost or corrupted to total number of datagrams sent by the sender unit. Periodically, the receiver sends to the sender a "SYN" datagram (step 11), reporting statistics regarding the data which has been successfully received and/or was not received or was corrupted. This includes the following data which is used in the PID control algorithm being described herein along with other data relating to exactly which datagrams have been received and lost and information regarding where data should be located in the output file: (1) Number of datagrams lost or corrupted (NAK count); (2) Number of datagrams received; and (3) Number of duplicate datagrams received. The sender, of course, always knows exactly how many datagrams have been sent.

Using this SYN data, the sender computes an error rate (step 15): the percentage of datagrams sent during this SYN period lost. A previously computed or specified error rate (step 13), e.g. of 2%, is used as a target-rate. The error rate is the process variable in the modified PID control algorithm. The user may also have set a desired maximum throughput or "speed limit" (e.g., 1000 KB/sec). The actual speed is allowed to rise as high as possible below this limit while keeping the error rate below 2%.

Now that the measured error has been determined, the "manipulated value" (to be used in modifying the IDD and thus the transmission rate) can be calculated (step 17) based on its three basic components. The three (unfactored) components could be physically computed as follows:

Proportional=measured error

Integral=measured error+last computed integral

Derivative=measured error−last computed measured error (Note: there are many ways to calculate these values. Different methods have advantages for calculations in various given situations.)

After each component is calculated, it is multiplied by its own preset tuning factor or K value, which has been determined through experimentation to achieve the transmission behavior sought. These proportional, integral and derivative tuning factors of the PID control may be preset constants or dynamically calculated values. If preset constants are used, they may be overridden by a system user at a time of system initiation. They can obviously be modified as constants or per specific environment in the future. For example, in one preferred embodiment, the tuning factors may be preset as:

| $K_p$ | $K_i$ | $K_d$ |
|---|---|---|
| .125 | .050 | .050 |

These particular values result in a system that is slightly overdamped ($\zeta$=1.25>1), where $$\zeta = \frac{K_p}{2\sqrt{K_i K_d}}.$$

When the program initiates, a user may choose to override these values. The sum of the factored components becomes the manipulated variable which will be used to modify the existing IDD.

In order to avoid extreme short term fluctuations in transmission speed (as determined by the Inter-Datagram Delay, which is controlled by the value of the PID function), one-time acceleration (as represented by the manipulated variable) can be limited to 25% of its current value and one-time deceleration can likewise be limited to 20% of its current value. That is, the PID control may include acceleration and deceleration limits, which can be preset values (such as the 25% maximum acceleration and 20% maximum deceleration used by way of example). Accordingly, the manipulated variable is adjusted (step 19) so as not to exceed these acceleration/deceleration limits. Still further, the PID control program can be set to never decelerate the sender's data injection rate to fewer than 8 datagrams/sec or 60 KB/sec). That is, there can be an absolute minimum or floor to the data transmission rate. Thus, if the manipulated variable falls below that minimum, it will be reset to the minimum (step 21). Any of the preset limits can be altered as desired by a user at system initiation.

Figure 2:
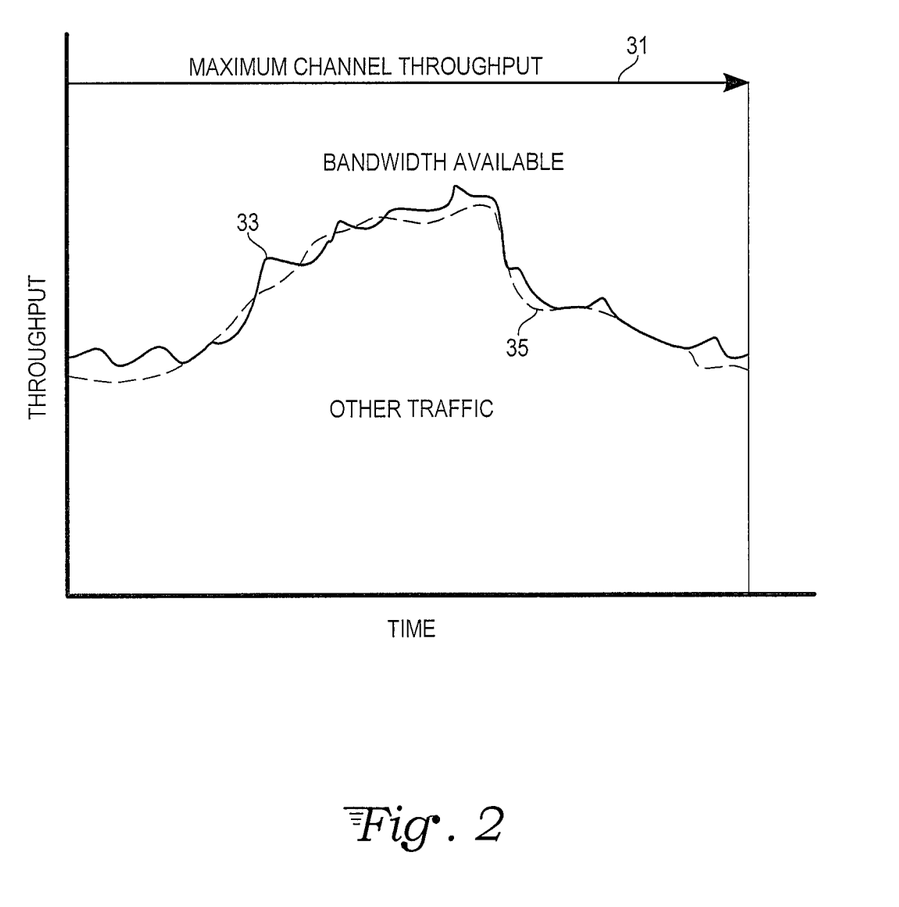
FIG. 2 is a graph of a typical data channel with a maximum throughput and typical variable traffic, wherein a sender unit in a system according to the present invention uses PID control to track available bandwidth and send at a data transmission rate that uses as much of the variable available bandwidth of the data channel as possible.

Once the manipulated variable has been calculated, the IDD is modified accordingly (step 23), and the cycle of steps repeats with new SYN datagrams. The result is seen in the representative graph of data bandwidth usage of FIG. 2. The established data channel has a maximum throughput 31 and variable data traffic 33 from other senders sharing the channel. The PID control tracks the available bandwidth by continually monitoring the error rate. The PID computed availability of channel bandwidth 35 will naturally reflect both an averaging effect and a delay from the fact that it relies on acknowledgement messages (SYN data) from the receiver unit and from the processing time itself before the data transmission rate can be adjusted. Nevertheless, the system uses as much of the available channel bandwidth in the network as possible consistent with its goal of keeping the error rate below 2% together with the imposed acceleration/deceleration and absolute speed limits of the PID control.

Using PID Control with Pluribus

In yet another embodiment, a system and method containing PID control in accord with the invention may be further enhanced by implementing it for yet another data transfer technology referred to herein as "Pluribus". Pluribus is a technology (see US Patent Application Publication 2009/0204859A1, which is incorporated herein by reference) that allows creation of controlled amounts of redundancy and the use of the redundancy to recover the initial data. The PID technology could be used to control the number of redundant datagrams transmitted initially based on the number of datagrams that are predicted to be lost out of each set of initial datagrams. PID control minimizes the overuse of redundancy.

Figure 3:
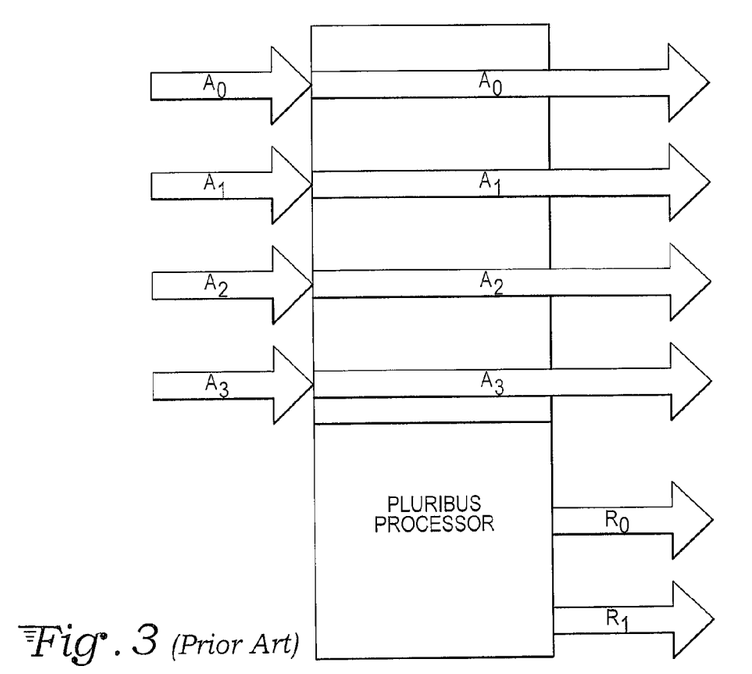
FIGS. 3 and 4 are block diagrams illustrating input and output data streams in two respective modes of a Pluribus implemented system.
Figure 4:
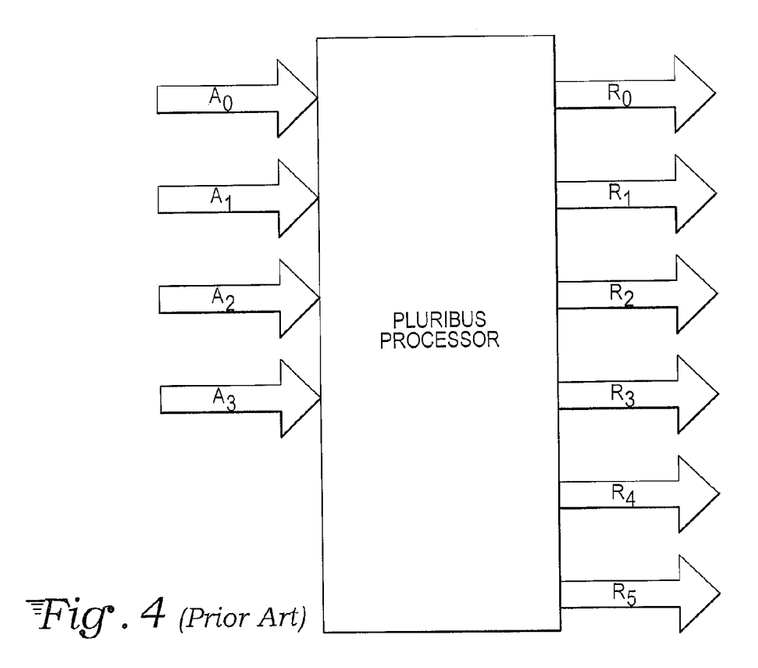

There are two basic operational modes for Pluribus. FIG. 3 shows the simplest application. A set of data input streams $A_0$-$A_3$, here four in number, are output as identical data output streams $A_0$-$A_3$ together with additional data output streams $R_0$-$R_1$, here two in number, that are computed to provide redundancy to the four original streams $A_0$-$A_3$. The net is that any four of the six output streams are sufficient to recover the four input streams. FIG. 4 shows a more advanced configuration. The four data streams $A_0$-$A_3$ are consumed by Pluribus and six completely new data streams $R_0$-$R_6$ are created. None of the output data streams contains the contents of the input streams. However, any four of the six output streams are sufficient to recover the input data; but receipt of only three streams is insufficient to recover any of the original data.

Figure 5:
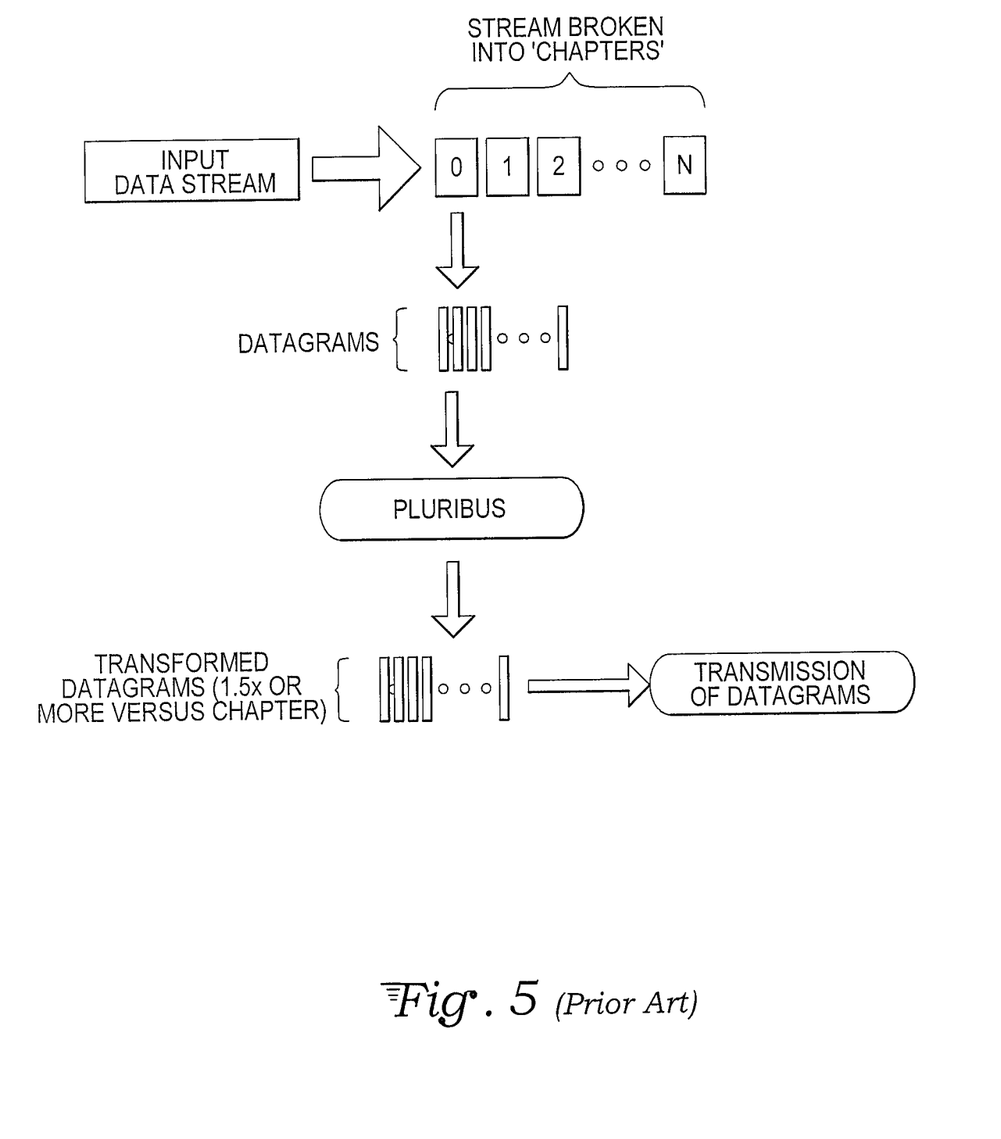
FIG. 5 is a block diagram illustrating the basic operation of Pluribus implemented data transmission.

FIG. 5 shows the transmission process. The incoming data stream is broken up in to chapters which are numbered from 0 . . . n. Each chapter is then subdivided into a number of datagrams of convenient size. Each of the datagrams within a given chapter is then processed through Pluribus to produce a redundant pool of datagrams which is larger than the original number of datagrams. For discussion, assume that a chapter contains 64 datagrams and that after Pluribus processing, 128 redundant datagrams exist for the chapter. The system, e.g., the PID-adapted Flume system described above, would then transmit 64 redundant datagrams to the receiver. At a future point in time, the receiver would inform the transmitter how many additional datagrams are required to make a set of 64 to allow reconstruction of the original chapter's data.

PID control can be used to modify the amount of redundant data that is transmitted to maximize throughput. One of the key functions of Pluribus is its ability to correct errors in a chapter of datagrams by using the data in a small subset of the datagrams. In other words, if a chapter of n datagrams is found by the receiver to contain errors, only n/m of the datagrams in the chapter are needed to recover the entire chapter. These "redundant datagrams" can either be explicitly requested of the sender by the receiver upon detection of the error or they can be appended to the original chapter in the first transmission. There is an obvious tradeoff. Explicit requests save the overhead of redundant datagrams on every chapter transmitted but demand time-consuming transmissions of the requests by the receiver to the sender and the retransmission of datagrams by the sender. Always sending redundant datagrams has the obvious converse impact. Network conditions (heavy vs. light data loss and corruption) dictate whether or not and how many redundant datagrams are required.

With PID control, if it is predictable that 3 datagrams, for example, will be lost out of each chapter's set, then the transmitter could transmit 64+3=67 datagrams under the theory that the receiver will receive 64 and no additional protocol overhead will be required. Or, the cost/benefit advantage could cause the sender to transmit one or two additional datagrams to avoid the increasingly less likely requirement for future datagram loss recovery.

Another key function of Pluribus is its control of multiple channels between a sender and each of its one or more receivers. This enables Flume to take advantage of multiple simultaneous transmissions, per se, and to react to changing network conditions by weighting transmission loads appropriately to the highest throughput links as the throughputs increase and decrease. PID control can be applied to monitor the throughput on each of multiple links and shift the balance among them to maximize total throughput.

Compression Control

There are many different algorithms that Flume uses to compress data. These algorithms differ in terms of their effectiveness on the particular data being transmitted and the processing overhead suffered in their execution. Furthermore, these algorithms reflect a tradeoff between compression rate and resources consumed (mostly CPU, but also memory in some cases).

PID control can be applied to monitor the ongoing effectiveness of compression (i.e., in terms of the degree of compression being achieved and/or the processing time overhead suffered) and either change parameters in the currently applied compression algorithm or change to a different algorithm on the fly.

Rsync Block Size Control

Flume's "Rsync lookalike" function compares the data content of a file that was previously sent to a receiver with a changed version of that file to identify differences. In the extreme, only the differences would need to be resent. In actuality, data is divided into blocks to be compared and a complete block is sent if any changes are detected in that block. Processing efficiencies are achieved by having large blocks. Less data can be sent by having small blocks (i.e., less unchanged data).

PID control can be used to modify the block size on the fly to balance the expense of processing time against resultant throughput.

What is claimed is:

1. A method integrated into a computer data transmission system of transferring data between a sender and a receiver in a datagram-based network, the method comprising:
   establishing a data channel between a sender unit and a receiver unit;
   establishing a feedback channel separate from the data channel between the sender and receiver units;
   sending datagrams from the sender unit to the receiver unit over the data channel continuously until a source of data is exhausted or the sending is paused at the request of the receiver unit,
      wherein the sender unit groups datagrams to be sent into chapters of datagrams and creates an output stream containing a controlled amount of redundancy that allows each chapter of datagrams to be recoverable from a subset of datagrams,
      proportional-integral-derivative (PID) control being applied by the sender unit over the amount of redundancy of the chapters of datagrams in the output stream and also over a data transmission rate of datagrams over the data channel so as to maximize use of available bandwidth in the established data channel independent of network latency,
      wherein application of PID control over the data transmission rate adjusts an inter-datagram delay establishing a time duration between the sending of consecutive datagrams; and
   sending acknowledgment messages from the receiver unit to the sender unit over the feedback channel at predetermined intervals and using the acknowledgement messages in the sender unit to track unsuccessfully transmitted datagrams, the PID control adapted to react to any changing network transfer conditions by changing the amount of redundancy and the data transmission rate,
      wherein a process variable monitored by the PID control is a rate of datagram loss that is calculated as a ratio of number of datagrams lost or corrupted, as determined from the acknowledgement messages, to total number of datagrams sent by the sender unit,
      a PID error value thereby being the rate of datagram loss minus a user-specified loss rate,
      the process variable for the PID control having tuning factors $K_p$, $K_i$ and $K_d$ for component proportional, integral and derivative terms of that process variable selected such that $$\zeta = \frac{K_p}{2\sqrt{K_i K_d}} \geq 1.$$

2. The method as in claim 1, wherein datagrams tracked as unsuccessfully transmitted are resent over the data channel.

3. The method as in claim 1, wherein proportional, integral and derivative tuning factors of the PID control are preset constants which can be overridden by a system user at a time of system initiation.

4. The method as in claim 1, wherein proportional, integral and derivative tuning factors of the PID control are dynamically calculated values.

5. The method as in claim 1, wherein the PID control has a setpoint for the process variable which is a preset rate of datagram loss which can be overridden by a system user at a time of system initiation.

6. The method as in claim 1, wherein the PID control further applies an acceleration limit to the data transmission rate.

7. The method as in claim 6, wherein the acceleration limit is a preset value of 25% of current data transmission rate which can be overridden by a system user at a time of system initiation.

8. The method as in claim 1, wherein the PID control further applies a deceleration limit to the data transmission rate.

9. The method as in claim 8, wherein the deceleration limit is a preset value of 20% of current data transmission rate which can be overridden by a system user at a time of system initiation.

10. The method as in claim 1, wherein the PID control further applies a minimum data transmission rate.

11. The method as in claim 10, wherein the minimum data transmission rate is a preset value of 60 KB/sec which can be overridden by a system user at a time of system initiation.

12. The method as in claim 1, further comprising PID control of data compression applied to datagrams being sent by the sender unit.

13. The method as in claim 12, wherein the sender unit has a plurality of available data compression algorithms characterized by different compression effectiveness defined according to both compression processing rates and degree of compression achieved, a monitored process variable for this PID data compression control including a proportion of sender processing time consumed by compression processing, the PID data compression control selecting a compression algorithm to be applied during a next period of data transmission based upon the monitored process variable so as to continually adapt to changing compression effectiveness and maximize the amount of data transferred by the sender unit.

14. The method as in claim 12, wherein the sender unit has a plurality of available data compression algorithms characterized by different compression effectiveness defined according to both compression processing rates and degree of compression achieved, the monitored process variable for this PID data compression control including a ratio of amount of compressed data sent by the sender unit to the original amount of uncompressed data, the PID data compression control adjusting a degree of data compression to be applied during a next period of data transmission so as to continually adapt to changing compression effectiveness and maximize the transfer of original uncompressed data.

15. A method as in claim 1, wherein the sender unit resends any changed versions of data files in blocks of datagrams, with only changed blocks being resent as determined by block comparison using an Rsync lookalike function, the method further comprising PID control of block size using as monitored process variables at least one of (1) processing time and (2) amount of data resent.

16. A computer data transmission system for transferring data over a datagram-based network, the system comprising:
a data channel;
a feedback channel separate from the data channel;
a sender unit coupled to the data channel and the feedback channel at a first endpoint of the datagram-based network, the sender unit transmitting datagrams over the data channel continuously until a source of data is exhausted or until paused by request of the receiver unit, wherein the sender unit groups datagrams to be sent into chapters of datagrams and creates an output stream containing a controlled amount of redundancy that allows each chapter of datagrams to be recoverable from a subset of datagrams,
the sender unit having proportional-integral-derivative (PID) control over the amount of redundancy of the chapters of datagrams in the output stream and also over a data transmission rate at which the datagrams are sent over the data channel so as to maximize use of available bandwidth in the established data channel independent of network latency,
wherein PID control over the data transmission rate by the sender unit adjusts an inter-datagram delay establishing a time duration between the sending of consecutive datagrams,
the sender unit also receives acknowledgment messages from the feedback channel to track unsuccessfully transmitted datagrams and react to any changing network transfer conditions,
wherein a process variable monitored by the PID control is a rate of datagram loss that is calculated as a ratio of number of datagrams lost or corrupted, as determined from the acknowledgement messages, to total number of datagrams sent by the sender unit,
a PID error value thereby being the datagram loss rate minus a user-specified loss rate,
the process variable for the PID control having tuning factors $K_p$, $K_i$ and $K_d$ for component proportional, integral and derivative terms of that process variable selected such that $$\zeta = \frac{K_p}{2\sqrt{K_i K_d}} \geq 1;$$

and
a receiver unit coupled to the data channel and the feedback channel at a second endpoint of the datagram-based network, the receiver unit receiving datagrams from the data channel, the receiver unit also transmitting acknowledgment messages at predetermined time intervals over the feedback channel to the sender unit.

17. The system as in claim 16, further comprising resending datagrams tracked as having been unsuccessfully sent to the receiver.

18. The system as in claim 16, wherein proportional, integral and derivative tuning factors of the PID control are preset constants which can be overridden by a system user at a time of system initiation.

19. The system as in claim 16, wherein proportional, integral and derivative tuning factors of the PID control are dynamically calculated values.

20. The system as in claim 16, wherein the PID control has a setpoint for the process variable which is a preset rate of datagram loss which can be overridden by a system user at a time of system initiation.

21. The system as in claim 16, wherein the PID control further applies an acceleration limit to the data transmission rate.

22. The system as in claim 21, wherein the acceleration limit is a preset value of 25% of current data transmission rate which can be overridden by a system user at a time of system initiation.

23. The system as in claim 16, wherein the PID control further applies a deceleration limit to the data transmission rate.

24. The system as in claim 23, wherein the deceleration limit is a preset value of 20% of current data transmission rate which can be overridden by a system user at a time of system initiation.

25. The system as in claim 16, wherein the PID control further applies a minimum data transmission rate.

26. The system as in claim 25, wherein the minimum data transmission rate is a preset value of 60 KB/sec which can be overridden by a system user at a time of system initiation.

27. The system as in claim 16, further comprising PID control of data compression applied to datagrams being sent by the sender unit.

28. The system as in claim 27, wherein the sender unit has a plurality of available data compression algorithms characterized by different compression effectiveness defined according to both compression processing rates and degree of compression achieved, a monitored process variable for this PID data compression control including a proportion of sender processing time consumed by compression processing, the PID data compression control selecting a compression algorithm to be applied during a next period of data transmission based upon the monitored process variable so as to continually adapt to changing compression effectiveness and maximize the amount of data transferred by the sender unit.

29. The system as in claim 27, wherein the sender unit has a plurality of available data compression algorithms characterized by different compression effectiveness defined according to both compression processing rates and degree of compression achieved, the monitored process variable for this PID data compression control including a ratio of amount of compressed data sent by the sender unit to the original amount of uncompressed data, the PID data compression control adjusting a degree of data compression to be applied during a next period of data transmission so as to continually adapt to changing compression effectiveness and maximize the transfer of original uncompressed data.

30. A system as in claim 16, wherein the sender unit is configured to resend any changed versions of data files in blocks of datagrams, with only changed blocks being resent as determined by block comparison using an Rsync lookalike function of the sender unit, the sender unit further having PID control of the block size, monitored process variables for the PID block size control being selected from at least one of (1) processing time and (2) amount of data resent.

\* \* \* \* \*